United States Patent [19]

Rogers et al.

[11] 4,405,509

[45] Sep. 20, 1983

[54] FRAGRANCE-EMITTING COMPOSITIONS AND ARTICLES

[75] Inventors: Jack M. Rogers, Tomball, Tex.; Richard Tokosh, Saddlebrook, N.J.; Charles Porter, Harriman; James Martine, Monroe, both of N.Y.

[73] Assignee: Avon Products, Inc., New York, N.Y.

[21] Appl. No.: 310,043

[22] Filed: Oct. 9, 1981

[51] Int. Cl.$^3$ .................. A61K 7/46; C11B 9/00
[52] U.S. Cl. .................................. 252/522 A
[58] Field of Search ............ 252/522 A; 428/484; 424/78, 76; 106/272

[56] References Cited

U.S. PATENT DOCUMENTS

| | | | |
|---|---|---|---|
| 2,300,769 | 11/1942 | Berry | 252/522 A |
| 3,856,699 | 12/1974 | Miyano et al. | 252/522 A |
| 4,051,159 | 9/1977 | Tsoucalas et al. | 252/522 A |
| 4,095,031 | 6/1978 | Engle | 252/522 A |
| 4,110,043 | 6/1978 | Newland | 252/522 |

FOREIGN PATENT DOCUMENTS

| | | | |
|---|---|---|---|
| 47-13640 | 4/1972 | Japan | 252/522 A |
| 53-115762 | 10/1978 | Japan | 252/522 A |

*Primary Examiner*—Helen M. S. Sneed

[57] ABSTRACT

Compositions which releases fragrance without burning and which comprise a petroleum wax base, 2 to 7 weight percent butyl rubber, 1 to 5 weight percent ethylene vinyl acetate copolymer and 9 to 15 weight percent fragrance are described. The compositions can be molded or otherwise formed into durable fragrance-emitting articles.

The preferred compositions comprise 73 to 88 weight percent paraffin wax, 0 to 10 weight percent microcrystalline wax, 0 to 10 weight percent petrolatum, 1 to 5 weight percent ethylene vinyl acetate copolymer, 2 to 7 weight percent butyl rubber and 9 to 15 weight percent fragrance. Such compositions may be flush molded into hollow shells which may be filled, preferably with a foamed wax.

8 Claims, No Drawings

FRAGRANCE-EMITTING COMPOSITIONS AND ARTICLES

BACKGROUND OF THE INVENTION (a) Field of the Invention

The present invention provides compositions which emit fragrance without burning. The articles formed from the compositions have improved durability and fragrance release characteristics.

(b) State of the Art

Fragrance-emitting articles formed from thermoplastic materials are known in the art. Specifically U.S. Pat. No. 4,110,261 describes two less than satisfactory types of prior art fragrance-emitting articles, one formed from a paraffin wax composition and the second from a polyamide resin composition. The former composition is said to form relatively soft articles having a dull glossless surface while the surface of the latter becomes tacky with age and is difficult to keep clean.

The fragrance-emitting articles claimed in U.S. Pat. No. 4,110,261 contain about 15% fragrance in a polymer-petroleum wax composition, wherein the polymer is selected from the group consisting of ethylene vinyl acetate, ethylene vinyl acetate acid terpolymer, ethylene ethyl acrylate, ethylene isobutyl acrylate, polyethylene and polypropylene, has an average molecular weight below 10,000 and comprises 3 to 25 weight percent of composition.

It has now been discovered that fragrance-emitting articles having a petroleum wax base can be shipped with minimal packaging when their durability and strength are increased by incorporation of butyl rubber, as well as ethylene vinylacetate copolymer, into the wax base. Further, more efficient delivery of fragrance can be achieved with the articles of the invention.

SUMMARY OF THE INVENTION

This invention relates to fragrance-emitting compositions and durable, shaped articles formed from such compositions. The compositions comprise 2 to 7 weight percent butyl rubber and 1 to 5 weight percent ethylene vinylacetate copolymer in a fragrance-containing petroleum wax base. Generally the petroleum wax base comprises paraffin in combination with sufficient petrolatum and/or microcrystalline wax to provide 0 to 10 weight percent of each in the overall fragrance-emitting composition. Articles of the invention are durable and can be shipped in film wrappers without molded packaging.

DETAILED DESCRIPTION OF THE INVENTION

This invention relates to compositions which can be shaped into self-supporting articles capable of emitting a fragrance over a sustained period. The compositions comprise a petroleum wax material containing butyl rubber, ethylene vinyl acetate copolymer and fragrance. Articles formed from the compositions of the invention exhibit increased durability and strength. Thus, the expense of providing and shipping special shock-resistant packaging for the articles can be avoided. More specifically, in the practice of the present invention, 2 to 7 weight percent butyl rubber and 1 to 5 weight percent ethylene vinyl acetate copolymer are added to a fragranced petroleum wax base to enhance durability without reducing fragrance delivery. The petroleum wax base generally comprises in major part paraffin wax, generally of the 138° F. to 145° F. melting point, fully refined, high penetration type. In addition, the wax base preferably includes other petroleum waxes to reduce the brittleness of the paraffin. Preferably these waxes include sufficient microcrystalline wax and petrolatum to provide up to about 10 weight percent of each in the total fragrance-emitting composition. These waxes impart flexibility to and reduce crystallinity of the paraffin. Both also serve to enhance fragrance retention.

The ethylene vinyl acetate copolymer utilized in the practice of the invention should be compatible with paraffin and preferably has a molecular weight low enough to permit mixing, generally below about 10,000. Preferred copolymers are resins sold by duPont under the trademarks Elvax 250 and 210 which contain about 28% vinyl acetate and have a molecular weight below 10,000. The copolymer enhances flexibility and surface hardness of the composition. It is preferable to minimize the quantity of copolymer since efficiency of fragrance delivery is reduced as the quantity of copolymer increases according to subjective tests by trained panels. Specifically at levels over 4 to 5 weight percent copolymer in the overall composition, fragrance delivery is reduced. Generally at levels of 1 to 5 weight percent, acceptable results are achieved in the practice of the invention. Optimally levels of about 2 to 3 weight percent are employed.

The butyl rubber which is employed may be pure solid butyl rubber. Alternatively a preblend of butyl rubber and paraffin wax may be employed. Particularly preferred for use in making the invention is a 30/70 butyl rubber/paraffin wax preblend. Tensile strength and stretch are improved due to addition of the butyl rubber.

The butyl rubber is limited to between 2 and 7 weight percent of the overall composition. At levels below 2 weight percent, the composition becomes more brittle and has reduced sheen. Above 7 weight percent the composition becomes cheesy and stringy.

The fragrance is present in compositions of the invention in amounts ranging from 9 to 15 weight percent. Even at the lower end of this range, adequate fragrance delivery is observed in subjective tests by a trained fragrance panel.

Additives, such as dyes, pigments or other suitable coloring materials may be incorporated in the compositions if desired. Stabilizing materials such as ultraviolet absorbers, anti-oxidants or the like may also be employed.

The compositions generally are formed into selfsupporting fragrance-emitting articles of the invention by a molding process. Such molding can be effected according to conventional techniques. These methods commonly involve homogeneously mixing the ingredients at a temperature high enough to maintain the materials in a liquid mixture and then pouring the molten mixture into a mold.

Flush molding as described in U.S. Pat. No. 4,110,261 is a preferred molding technique. Where this method is employed, the fragrance-emitting composition is a hollow shell. This shell is preferably filled with a lightweight foamed wax material. This core imparts added strength to the article but may comprise less expensive materials than the fragrance-emitting shell.

The following examples are illustrative of the invention.

EXAMPLE 1

Compositions were formulated as follows:

|  | A | Control |
|---|---|---|
| Paraffin Wax 145 | 57.5 | 67.5 |
| Micro Wax White 170/180 | 10.0 | 10.0 |
| Paraflin 212 | 2.5 | 2.5 |
| Petrolatum | 5.0 | 5.0 |
| Butyl rubber/paraffin (30/70) | 10.0 | — |
| Fragrance | 15.0 | 15.0 |

The presence of the butyl rubber improved the breaking strength of Composition A relative to the control as shown by Instron readings and tensile strength measurements. A two pound per square inch improvement in the butyl rubber composition was observed.

EXAMPLE 2

Preferred compositions of the invention were formulated as follows:

|  | [Owl] | [Baby] |
|---|---|---|
| Paraffin Wax 145 | 64.35 | 65.90 |
| Butyl Rubber/Paraffin Wax 140 (30/70) | 4.50 | 4.50 |
| Micro Wax White 170/180 (Witco) | 10.00 | 10.00 |
| Ethylene Vinylacetate Copolymer 210 (duPont) | 2.50 | 2.50 |
| Petrolatum (Witco Protopet White I.S.) | 5.50 | 5.50 |
| Titanium Dioxide | 2.00 | 0.60 |
| Dyes/Pigments | 0.65 | 0.50 |
| Octylphenol-Benzotriazole | 0.25 | 0.25 |
| Octoxybenzophenone | 0.25 | 0.25 |
| Fragrance | 10.00 | 10.00 |

To prepare the compositions, the paraffin wax, microcrystalline wax and petrolatum are heated to about 190° to 210° F. When molten, the mixture is homogeneously mixed with the ethylene vinylacetate and butyl rubber by means of a high shear mill. The mixture is cooled to 170° to 180° F., whereupon the UV absorbers and pigments are added to the mixture and homogeneously mixed in a high shear mill. The resulting mixture is cooled to 160° to 170° F. The fragrance is then added and homogeneously mixed using a high shear mill.

The resulting composition may then be formed into a desired shape, preferably by flush molding using the technique of U.S. Pat. No. 4,110,261. According to this technique, a mold of the desired configuration and having a filling opening is prepared by immersion in an emulsion of silicone oil in water at 105° F. and then blown free of water droplets.

One of the above-prepared compositions at 170°–180° F. is then poured through the mold opening into the mold cavity until it is filled. The fill hardens from its outside surface in contact with the wall of the mold cavity, and then progressively inwardly toward the center of the cavity, thus forming a shell surrounding a still fluid body. The fill is allowed to dwell in the mold for a time period sufficient to produce a solidified shell of the desired weight or thickness. The mold is then inverted and the unsolidified material within the solidified shell is poured out. The mold is then returned to an upright position with the mold opening at the top, and the excess solidified fill at the opening is cut off.

Preferably the hollow shell so molded is filled with core wax that has been aerated and is at a temperature approximately 5° F. below the shell's melting point. A preferred core formulation contains 80.00% weight paraffin wax 145, 15.00% weight microcrystalline wax 170°–180° F. and 5.00% weight polyethylene wax of the type sold as AC-400 by Allied Chemical.

EXAMPLE 3

The following compositions were processed as above described:

|  |  |  |
|---|---|---|
| Paraffin Wax 145 | 70.90 | 65.90 |
| Butyl Rubber/Paraffin 140 (30/70) | 4.50 | 4.50 |
| Micro Wax 170/180 (Witco) | 10.00 | 10.00 |
| Elvax 210 (duPont) | 2.50 | 2.50 |
| Petrolatum (Witco Protopet White I.S.) | 5.50 | 5.50 |
| TiO$_2$ | 1.10 | 1.10 |
| UV 5411 | 0.25 | 0.25 |
| UV 531 | 0.25 | 0.25 |
| Fragrance | 5.00 | 10.00 |

EXAMPLE 4

Compositions in accordance with the invention were formulated as follows:

|  | 1 | 2 | 3 | 4 |
|---|---|---|---|---|
| Paraffin Wax 145 | 66.58 | 59.08 | 61.08 | 56.58 |
| Butyl Rubber B-30 (Moor and Munger) | 4.50 | 4.50 | — | 4.50 |
| Micro Wax 170/180 | 10.00 | 10.00 | 10.00 | 10.00 |
| Elvax 210 (duPont) | 2.50 | 10.00 | 10.00 | 2.50 |
| Petrolatum (Witco) | 5.00 | 5.00 | 5.00 | 5.00 |
| TiO$_2$ | 0.80 | 0.80 | 0.80 | 0.80 |
| Durowax 500 (Chevron Chem.) | — | — | — | 10.00 |
| Paraflint 212 | — | — | 2.50 | — |
| Dye | 0.12 | 0.12 | 0.12 | 0.12 |
| UV 5411 | 0.25 | 0.25 | 0.25 | 0.25 |
| UV 531 | 0.25 | 0.25 | 0.25 | 0.25 |
| Fragrance | 10.00 | 10.00 | 10.00 | 10.00 |

All formulations were molded into hollow shaped articles and were dropped about four times from five and one-half feet. None cracked as a result of this test, thus indicating excellent durability. Further tests indicated that the absence of butyl rubber results in a more brittle product.

We claim:

1. A fragrance-emitting composition comprising 73 to 88 weight percent petroleum wax, 1 to 5 weight percent ethylene vinyl acetate copolymer having an average molecular weight below 10,000, 2 to 7 weight percent butyl rubber and 9 to 15 weight percent fragrance.

2. The composition of claim 1 wherein the petroleum wax is selected from the group consisting of paraffin wax, microcrystalline wax and petrolatum.

3. The composition of claim 1 wherein the petroleum wax comprises paraffin wax, 0 to 10 weight percent microcrystalline wax and 0 to 10 weight percent petrolatum.

4. A self-supporting fragrance-emitting shaped article having a composition comprising 73 to 88 weight percent petroleum wax, 1 to 5 weight percent ethylene vinyl acetate copolymer having an average molecular weight below 10,000, 2 to 7 weight percent butyl rubber and 9 to 15 weight percent fragrance.

5. The article of claim 4 wherein the petroleum wax is selected from the group consisting of paraffin wax, microcrystalline wax and petrolatum.

6. The article of claim 4 wherein the petroleum wax comprises paraffin wax, 0 to 10 weight percent microcrystalline wax and 0 to 10 weight percent petrolatum.

7. The article of claim 4 wherein the composition is shaped as a hollow shell.

8. The article of claim 7 wherein the shell is filled with foamed wax.

* * * * *